3,684,447
PRODUCING HYDROGEN BY CONTACT OF STEAM WITH IRON OXIDE PROMOTED WITH ZINC FERRITE
Harlin D. Johnston and Roy C. Fury, Bartlesville, Okla., assignors to Phillips Petroleum Company
No Drawing. Filed Oct. 6, 1970, Ser. No. 78,565
Int. Cl. C01b 1/08; B01j 11/22
U.S. Cl. 423—658                                    6 Claims

ABSTRACT OF THE DISCLOSURE

Zinc ferrite is incorporated with iron oxide and used to produce hydrogen from steam in the steam-iron process.

---

This invention relates to the production of hydrogen. In one of its aspects, it relates to the production of hydrogen employing the steam-iron process. In a further aspect of the invention, it relates to a promoted iron oxide catalyst for use in the production of hydrogen from steam in the steam-iron process.

In one of its concepts, the invention provides a catalyst consisting essentially of iron oxide promoted with zinc ferrite. In another of its concepts, the invention provides an improved process for the production of hydrogen from steam in the steam-iron process employing a catalyst which is essentially iron oxide promoted with zinc ferrite. In a further concept of the invention, it provides a catalyst for the steam-iron process for the production of hydrogen by incorporating zinc ferrite and iron oxide at an elevated temperature to form a zinc promoted iron oxide catalyst.

As known, hydrogen is used in a variety of processes for beneficiating hydrocarbonaceous materials, such as petroleum, coal, petroleum residua, tar sands, oil shale and the like. Usually, the objective is to convert such materials to liquid hydrocarbons of certain properties which are required for various uses of the products. Thus, increasing quantities of hydrogen are now being sought and used.

Considerable emphasis has been placed on hydrogen production in recent years because of dwindling supplies of crude oil and because of the likely necessity for converting coal, petroleum residuum, tar sands, or oil shale to liquid hydrocarbons. Such conversions require copious volumes of low cost, relatively pure hydrogen which is needed to be generated on location.

A promising route to such hydrogen is the steam-iron process. In this process a reduced iron oxide is oxidized with steam to produce hydrogen and then reduced again by contact with low cost reducing gases to complete the two-stage cycle. In practice, the process is a continuous one in which the solid iron oxide is alternatingly in or moved between a reduction zone and an oxidation zone.

A great deal of development work has been carried out on the steam-iron process to make it more efficient and more economical. The present invention provides an improvement in the steam-iron process by providing a promoter for the iron oxide which increases the conversion rate of the iron oxide in both the oxidative and the reductive phases of the cycle, and which minimizes the amount of iron oxide required to operate such a system.

We have now discovered that iron oxide promoted with zinc ferrite as herein described in more detail is an excellent catalyst or contact mass for the production of hydrogen from steam in the steam-iron process. It appears that zinc ferrite is the form in which the zinc metal should be incorporated into the iron oxide to produce the excellent results which are herein reported.

It is an object of this invention to provide a process for producing hydrogen. It is a further object of this invention to provide a novel catalyst for the production of hydrogen. It is a still further object of the invention to provide a process for the production of hydrogen from steam. Another object of the invention is to provide a catalyst or contact mass for the production of hydrogen in the so-called steam-iron process which will have considerably increased longevity in both the oxidative and reductive cycles of the operation. It is a still further object of the invention to so incorporate zinc into an iron oxide catalyst suitable for use in the steam-iron process that the iron oxide is so promoted that excellent oxidative and reductive results can be employed and over a great many cycles.

Other aspects, concepts, objects and several advantages of the invention are apparent from a study of this disclosure and the appended claims.

According to the present invention, an iron oxide catalyst suitable for use in the steam-iron process for the production of hydrogen is promoted by incorporating therewith zinc in the form of zinc ferrite.

Still according to the invention, there is provided a process for production of hydrogen which comprises passing steam into contact with a steam-iron oxide catalyst promoted with zinc introduced or incorporated with the catalyst in the form of zinc ferrite.

The iron oxide which is used in the improved steam-iron process of the present invention comprises a major amount of iron oxide ($Fe_2O_3$) and a minor amount of a zinc compound. The zinc compound now preferred is zinc ferrite, $ZnFe_2O_4$ (sometimes written as $ZnO \cdot Fe_2O_3$), or its reduced form, $ZnFe_3O_5$ (sometimes written as $ZnO \cdot Fe_3O_4$). These zinc ferrites are present in the iron oxide in amounts such that the total composite will contain from about 1 to about 20, preferably from about 4 to about 10, and still more preferably from about 5 to about 8 weight percent zinc, calculated as the metal, based on the weight of the total $Fe_2O_3$-containing composition. Of these two ferrite compounds, the oxidized form of zinc ferrite, $ZnFe_2O_4$, is presently preferred because this is the convenient and usual commercial form for this material.

It cannot be said with certainty what form or forms the zinc ferrite assumes in each of the operating stages of the cycling process. However, it is known that the zinc promoter must be in the zinc ferrite form at least at the time of incorporation into the iron oxide. The incorporation of other forms of zinc, such as zinc oxide, zinc nitrate, or other zinc salts does not give the promoting results.

The zinc ferrite can be incorporated into the iron oxide by any suitable catalyst or contact mass or preparation method, preferably by methods such as coprecipitation and mixing methods which provide intimate blends of these two materials. It has been found, however, that the most effective means of incorporating the zinc ferrite is to prepare the zinc ferrite in situ; that is, to form the zinc ferrite compound in a matrix of iron oxide. This preferred procedure is carried out by reacting metallic zinc with the iron oxide under zinc ferrite-forming conditions.

PREPARATION OF ZINC FERRITE

The method by which the zinc ferrite is formed in a matrix of iron oxide ($Fe_2O_3$) is as follows. Using finely divided zinc metal and iron oxide, which are finer than 50 mesh and preferably finer than 100 mesh, the two materials are brought together and intimately blended, preferably in the absence of an oxidizing atmosphere. The blending can be conveniently carried out in the absence of any liquid by suitable mixing, milling, or other blending means such that an intimate mixture of these two materials is obtained.

The mixture, containing from about 0.5 to about 20 weight percent zinc metal, is then heated, in the absence of an oxidizing atmosphere and preferably in an inert gas such as nitrogen, for a time and at a temperature sufficient for the zinc metal to react with the iron oxide. Generally this will require temperatures in the range of from about 850 to about 1400° F., for a time in the range of from about 0.1 to about 5 hours. The time will be dependent to an extent on the sizes of the particles and of the total mass.

At the completion of the period of heating in the inert atmosphere, the zinc-containing material is allowed to come to an oxidized state. This oxidation occurs very readily and can be effected by merely bringing an oxidizing atmosphere such as air into contact with the zinc-containing material either at elevated temperature or at a lower temperature such as room temperature. The reacted zinc and oxide can be oxidized at the temperature which the mass has reached at the end of the initial heating. If desired, the oxidation can be effected by merely introducing the material into the oxidation stage of the steam-iron process wherein steam is contacted with the material at an elevated temperature to generate hydrogen. The critical feature of this mode of preparation is that the iron oxide must react with zinc in the metallic state rather than in the zinc oxide state for best results. Hence, in all stages of preparation up through the high temperature heating stage, care should be taken to avoid substantial conversion of the zinc metal to zinc oxide.

STEAM-IRON PROCESS CONDITIONS

The zinc-promoted iron oxides of the present invention are utilized in the steam-iron process under conventional conditions. That is, the zinc-modified iron oxide is used in the same manner and under the same conditions as the non-modified iron oxide for the reductive and oxidative portions of the process to produce hydrogen. These conditions are generally known in the art.

The improved iron oxide of the invention results in a greater conversion rate in each phase of the cycle and thus significantly reduces the cycle time. Additionally, the zinc-promoted iron oxide will remain active for a significantly longer period of time and thus iron oxide replacement costs are reduced.

In general, both the reductive and the oxidative portions of the cycle are carried out at temperatures in the range of from about 1200 to about 1700, preferably from about 1300 to about 1450° F. Any convenient pressure can be used, such as pressures in the range of from about zero to about 2000 p.s.i.g. Sub-atmospheric pressures can be employed. However, such pressures are now not preferred.

Any suitable mode of contact between the iron oxide and the reducing or oxidizing gases can be used, including fixed bed operation, fluidized bed operation and the like. A particularly preferred mode is the free-falling bed wherein particles of the iron oxide of the invention are allowed to fall through a reaction chamber while contacting a countercurrent flow of reaction gases.

The size and form of the zinc-promoted iron oxide can be any which are suitable for the mode of contacting. Hence, the iron oxide can be pellets, extrudates, agglomerates, powder, and the like. The oxide can be variously supported and/or used in fixed, moving or fluidized bed operations.

The reactive gases in the reductive zone can be any suitable CO- and/or $H_2$-containing gas system. Particularly suitable are the CO- and $H_2$-containing synthesis gas or producer gas streams obtained by suitably reacting heavy carbonaceous fuels with air and steam. The oxidizing gas used in the hydrogen generation zone is preferably steam with few or no other components. Components which are substantially inert, e.g., $N_2$ can be present. Some air can be in the steam.

The flow rates of the iron oxide and of the reactive gases within the individual reaction zones will be such as to convert a suitable amount of these reagents. For example, the iron oxide is not generally reduced beyond about a 10% weight loss, preferably not beyond about a 7% weight loss because excessive reduction results in the formation of metallic iron in the iron oxide particles. The presence of metallic iron can cause sintering and a loss of activity of the iron oxide. Typically, the flow of reducing gas is such that about 65 or more percent conversion of that gas occurs. Similarly, the flow of steam is such that at least about 50% of the steam is converted. In a free falling bed operation, a typical gaseous hourly space velocity for both reactive gases is 300–350 GHSV.

The gaseous effluent from the oxidative zone of the process comprises hydrogen and steam with perhaps small quantities of hydrogen sulfide. The steam can be condensed and the hydrogen sulfide scrubbed from the stream so as to yield a hydrogen stream of about 99+ percent purity.

Example 1

A number of samples of metal-promoted and unpromoted iron oxides were tested under comparable conditions for the efficiency with which they could alternately be reduced with CO and oxidized with steam, the latter operation yielding free hydrogen gas.

The procedure was as follows: A porous woven quartz sample holder, about 2.5 mm. ID by 40 mm. long was filled with the 32/65 mesh iron oxide-containing sample; the holder was suspended from a recording balance by a quartz fiber and was positioned in an electrically heated one-inch diameter reaction tube; the sample was dried in a nitrogen atmosphere at 1292° F. and weighed; the iron oxide-containing sample was then reduced at 1292° F. in a preheated CO stream flowing at 25 l./hr. until a 10% weight loss was obtained; the reduction was then halted and the reduced iron oxide sample was then subjected to oxidation at 1292° F. by contact with pre-heated flowing steam until the weight loss had been regained. The steam atmosphere was prepared by passing nitrogen at 8 l./hr. through a water saturator at 201–205° F. and then through the reactor. The weight losses and gains during the iron oxide reduction and oxidation stages had previously been shown to closely correspond to CO consumption and $H_2$ production.

The different iron oxide-containing samples were prepared in various ways. The mixed oxide samples were prepared by intimately mixing, in an aqueous slurry, a mixture of the finely divided iron oxide and the finely divided promoter metal oxide compound followed by drying, calcining, and screening to obtain particles containing an intimate mixture of both oxides.

The coprecipitated samples were prepared by precipitating, with aqueous ammonia, aqueous solutions of ferric chloride or ferric nitrate in the presence of the oxides or the nitrate salts of the promoter metals followed by drying and calcining.

The zinc-ferrite-promoted materials of Runs 2, 3, and 4 were prepared by the in situ procedure using metallic zinc dust. For example, the material of Run 3 was prepared by adding 2 g. of $Z_n$ dust to 25 g. of $Fe_2O_3$ powder and then slurrying this mixture in 200 ml. $H_2O$ for about 1 hour in a high speed blender. The mixture was then dried in a nitrogen atmosphere at 400° F. and then calcined in nitrogen at 1300° F. for about one hour. The hot mixture was then allowed to cool to room temperature in air.

The results of the tests showing the suitability of the different iron oxide samples for use in the steam-iron process are shown in the table. For several of the runs, including the invention runs, the CO consumption rates and the $H_2$ production rates are shown after both the third and the tenth cycle of operation so that the effect of the promoter on the effective life of the iron oxide can be shown.

Run 1 shows the typical results obtained from an unpromoted iron oxide. In addition to the relatively low conversion rates for both the oxidation and reduction, there is a substantial loss in rates from the third to the tenth cycles.

Invention Runs 2, 3, and 4, in which zinc is introduced into the iron oxide as zinc ferrite ($ZnFe_2O_4$), according to the method of the present invention, show substantial improvements, when compared with unpromoted Run 1, in the relatively high conversion rates and in the relatively low rate of deactivation of the iron oxide as evidenced by the small change from the third to the tenth cycle. Because invention Run 2 shows an improvement in CO consumption rate only, the 1 weight percent zinc level is indicated to be about the minimum amount required for the invention. Similarly, because invention Run 4 shows improvements in both the CO consumption rate the $H_2$ production rate but shows carbon formation on the iron oxide, a maximum zinc content of about 20 weight percent is now indicated for the invention. Carbon formation is undesirable because it leads to inactivation and decreases the purity of the hydrogen product. Invention Run 3, on the other hand, containing 7.4 weight percent zinc in the iron oxide, shows spectacular results. Not only are the conversion rates high in comparison with the unpromoted iron oxide run, but the loss of activity on continued use is extremely low.

Reasonable variation and modification are possible within the scope of the foregoing disclosure and the appended claims to the invention the essence of which is that we have found that iron oxide catalyst or contact mass for use in the steam-iron process for production of hydrogen from steam can be excellently promoted by incorporating zinc thereinto the zinc being in the form of zinc ferrite.

We claim:

1. In the process for the production of hydrogen from steam in the steam-iron process, the improvement which comprises passing steam under hydrogen producing reaction conditions into contact with a catalyst which is essentially iron oxide promoted with zinc ferrite, the zinc ferrite being formed at an elevated temperature in a matrix of iron oxide ($Fe_2O_3$).

2. A process according to claim 1 wherein the zinc-ferrie is present in the iron oxide in an amount such that the total catalyst composite contains from about 1 to about 20 weight percent zinc calculated as metal based upon the weight of the total $Fe_2O_3$-containing composition.

3. A process according to claim 2 wherein the total catalyst composite contains from about 4 to about 10 weight percent zinc.

4. A process according to claim 3 wherein the total catalyst composite contains from about 5 to about 8 weight percent zinc.

STEAM-IRON PROCESS FOR HYDROGEN PRODUCTION

| Run | Promoter for iron oxide | CO consumption rate [a] | | | $H_2$ production rate [b] | | |
|---|---|---|---|---|---|---|---|
| | | 3d cycle | 10th cycle | Decrease, percent | 3d cycle | 10th cycle | Decrease, percent |
| 1 | None | 179 | 131 | 26.8 | 222 | 174 | 21.6 |
| 2 | 1% Zn (as zinc ferrite) | 323 | 273 | 15.5 | 342 | 248 | 27.5 |
| 3 | 7.4% Zn (as zinc ferrite) | 381 | 375 | 1.5 | 381 | 381 | 0 |
| 4 | 17% Zn (as zinc ferrite) | 458 | [d]430 | 6.1 | 319 | 310 | 2.8 |
| 5 | 1% ZnO (coprecip.) | 14 | | | 14 | | |
| 6 | 5% ZnO (coprecip.) | 14 | | | 20 | | |
| 7 | 1% CdO (coprecip.) | 99 | | | 284 | | |
| 8 | 5% CdO (coprecip.) | 30 | | | 30 | | |
| 9 | 5% Sn (mixed oxide) | 41 | | | 145 | | |
| 10 | 20% Sn (mixed oxide) | 1 | | | 18 | | |
| 11 | 5% NiO (coprecip.) | 31 | | | 39 | | |
| 12 | 5% CuO (coprecip.) | 14 | | | 28 | | |
| 13 | 5% $Ag_2O$ (coprecip.) | 49 | | | 70 | | |
| 14 | 10% $WO_3$ (coprecip.) | 14 | | | 20 | | |
| 15 | 36% $Al_2O_3$ (coprecip.) | 5 | | | 5 | | |

[a] In terms of cc. CO reacted per minute per gram of iron oxide-containing composition.
[b] In terms of cc. $H_2$ produced per minute per gram of iron oxide-containing composition.
[c] Calculated in weight percent based on weight of total $Fe_2O_3$-containing composition.
[d] Carbon formation observed.

Comparison Runs 5 and 6 show that not all modes of incorporating zinc into the oxide or not all forms of zinc-oxygen compounds are suitable for promoting the iron oxide of the steam-iron process. In these runs, zinc nitrate was coprecipitated with ferric chloride to yield a composition which was believed to be a mixture of zinc oxide and iron oxide. The iron oxide which was promoted with zinc in this manner gave a very poor performance for both the reduction and oxidation portions of the steam iron process cycle.

Comparison Runs 7–13 show still further that not all metals are suitable promoters for iron oxide in the steam-iron process. Of particular note are Runs 7 and 8 in which cadmium, an element adjacent to zinc in Group II–B, was tested as a promoter and shown to be ineffective. A number of metals, when incorporated into the iron oxide, give poorer results than the unpromoted iron oxide. The material of comparison Run 15 was essentially inactive.

It is a feature of the invention, in one of its preferred forms, that the weight loss of the iron oxide during the contact therewith of steam is controlled as herein described. The control is exercised as gauged by weight loss to correspond with avoidance of the formation of appreciable metallic iron within the catalyst. Generally, the weight loss will, as stated, be limited to not more than about 10, preferably 7 percent.

5. A process according to claim 1 wherein the weight loss of the iron oxide during the contact therewith of steam is controlled to be not more than about 10% by limiting the contact of the steam with the catalyst.

6. A process according to claim 5 wherein the reductive and oxidative portions of the steam-iron process cycles are effected at temperatures in the range of from about 1200 to about 1700° F.

References Cited

UNITED STATES PATENTS

| 314,342 | 3/1885 | Moore | 23—214 X |
| 3,428,416 | 2/1969 | Gie et al. | 23—51 R |
| 3,448,058 | 6/1969 | Arnold | 252—473 |
| 2,739,929 | 3/1956 | Madinger | 23—214 X |
| 3,017,250 | 1/1962 | Watkins | 23—214 |

OTHER REFERENCES

"Research," vol. 12, 1959, pp. 395, 401, 403. Copy in 23/51 Lit.

EDWARD STERN, Primary Examiner

U.S. Cl. X.R.

252—473; 423—594